(12) United States Patent
Kons et al.

(10) Patent No.: US 10,873,418 B2
(45) Date of Patent: Dec. 22, 2020

(54) ITERATIVE MULTI-LEVEL EQUALIZATION AND DECODING

(71) Applicant: Cohere Technologies, Inc., Santa Clara, CA (US)

(72) Inventors: Shachar Kons, Santa Clara, CA (US); Ronny Hadani, Santa Clara, CA (US); Christian Ibars Casas, Santa Clara, CA (US)

(73) Assignee: Cohere Technologies, Inc., Santa Clara, CA (US)

( * ) Notice: Subject to any disclaimer, the term of this patent is extended or adjusted under 35 U.S.C. 154(b) by 172 days.

(21) Appl. No.: 15/889,867

(22) Filed: Feb. 6, 2018

(65) Prior Publication Data

US 2018/0167165 A1 Jun. 14, 2018

Related U.S. Application Data

(63) Continuation-in-part of application No. PCT/US2017/046634, filed on Aug. 11, 2017.
(Continued)

(51) Int. Cl.
*H04L 1/00* (2006.01)
*H04L 27/26* (2006.01)
(Continued)

(52) U.S. Cl.
CPC .............. *H04L 1/0071* (2013.01); *H04L 1/00* (2013.01); *H04L 1/0041* (2013.01);
(Continued)

(58) Field of Classification Search
CPC ....... H04L 1/0071; H04L 1/00; H04L 1/0041; H04L 1/0045; H04L 25/03057;
(Continued)

(56) References Cited

U.S. PATENT DOCUMENTS

| 4,754,493 A | 6/1988 | Coates |
|---|---|---|
| 5,083,135 A | 1/1992 | Nagy et al. |

(Continued)

FOREIGN PATENT DOCUMENTS

| CN | 1235720 A | 11/1999 |
|---|---|---|
| CN | 101682316 A | 3/2010 |

(Continued)

OTHER PUBLICATIONS

Chilamkurti et al., Reliable Transmission Mechanism for safety-critical information in vehicular wireless networks, IEEE, vol. 2, pp. 514-517 (Year: 2010).*

(Continued)

*Primary Examiner* — April Y Blair
*Assistant Examiner* — Dipakkumar B Gandhi
(74) *Attorney, Agent, or Firm* — Perkins Coie LLP

(57) ABSTRACT

A wireless communication method for transmitting wireless signals from a transmitter includes receiving information bits for transmission, segmenting the information bits into a stream of segments, applying a corresponding forward error correction (FEC) code and an interleaver to each of the stream of segments and combining outputs of the interleaving to generate a stream of symbols, processing the stream of symbols to generate a waveform, and transmitting the waveform over a communication medium.

18 Claims, 10 Drawing Sheets

Related U.S. Application Data

(60) Provisional application No. 62/374,585, filed on Aug. 12, 2016, provisional application No. 62/379,184, filed on Aug. 24, 2016.

(51) Int. Cl.
    *H04L 25/03*     (2006.01)
    *H04L 5/00*     (2006.01)
    *H04L 27/36*     (2006.01)

(52) U.S. Cl.
    CPC ...... *H04L 1/0045* (2013.01); *H04L 25/03057* (2013.01); *H04L 27/2626* (2013.01); *H04L 27/36* (2013.01); *H04L 2025/03363* (2013.01); *H04L 2025/03611* (2013.01)

(58) Field of Classification Search
    CPC ................ H04L 27/2626; H04L 27/36; H04L 2025/03363; H04L 2025/03611
    See application file for complete search history.

(56) References Cited

U.S. PATENT DOCUMENTS

| | | |
|---|---|---|
| 5,182,642 A | 1/1993 | Gersdorff et al. |
| 5,623,511 A | 4/1997 | Bar-David et al. |
| 5,831,977 A | 11/1998 | Dent |
| 5,872,542 A | 2/1999 | Simons et al. |
| 5,956,624 A | 9/1999 | Hunsinger et al. |
| 6,212,246 B1 | 4/2001 | Hendrickson |
| 6,275,966 B1 * | 8/2001 | Sitterley ............... H03M 13/00 375/295 |
| 6,289,063 B1 | 9/2001 | Duxbury |
| 6,356,555 B1 | 3/2002 | Rakib et al. |
| 6,388,621 B1 | 5/2002 | Lynch |
| 6,426,983 B1 | 7/2002 | Rakib et al. |
| 6,498,789 B1 | 12/2002 | Honda et al. |
| 6,584,158 B1 | 6/2003 | Ito |
| 6,608,864 B1 | 8/2003 | Strait |
| 6,631,168 B2 | 10/2003 | Izumi |
| 6,704,366 B1 | 3/2004 | Combes et al. |
| 6,956,814 B1 | 10/2005 | Campanella |
| 7,010,048 B1 | 3/2006 | Shattil |
| 7,170,951 B1 * | 1/2007 | Perthold ............... H03F 1/3247 375/296 |
| 7,327,812 B2 | 2/2008 | Auer |
| 7,392,018 B1 | 6/2008 | Ebert et al. |
| 7,689,049 B2 | 3/2010 | Monro |
| 7,773,685 B2 | 8/2010 | Tirkkonen et al. |
| 7,864,877 B2 | 1/2011 | Hottinen |
| 8,229,017 B1 | 7/2012 | Lee et al. |
| 8,259,845 B2 | 9/2012 | Dent |
| 8,401,131 B2 | 3/2013 | Fety et al. |
| 8,547,988 B2 | 10/2013 | Hadani et al. |
| 8,619,892 B2 | 12/2013 | Vetter et al. |
| 8,717,210 B2 | 5/2014 | Eldar et al. |
| 8,879,378 B2 | 11/2014 | Rakib et al. |
| 8,892,048 B1 | 11/2014 | Turner |
| 8,976,851 B2 | 3/2015 | Hadani et al. |
| 9,031,141 B2 | 5/2015 | Hadani et al. |
| 9,071,285 B2 | 6/2015 | Hadani et al. |
| 9,071,286 B2 | 6/2015 | Hadani et al. |
| 9,083,483 B1 | 7/2015 | Rakib et al. |
| 9,083,595 B2 | 7/2015 | Rakib et al. |
| 9,130,638 B2 | 9/2015 | Hadani et al. |
| 9,282,528 B2 | 3/2016 | Hashimoto |
| 9,294,315 B2 | 3/2016 | Hadani et al. |
| 9,444,514 B2 | 9/2016 | Hadani et al. |
| 9,548,840 B2 | 1/2017 | Hadani et al. |
| 9,553,984 B2 | 1/2017 | Krause et al. |
| 9,590,779 B2 | 3/2017 | Hadani et al. |
| 9,634,719 B2 | 4/2017 | Rakib et al. |
| 9,660,851 B2 | 5/2017 | Hadani et al. |
| 9,668,148 B2 | 5/2017 | Hadani et al. |
| 9,712,354 B2 | 7/2017 | Hadani et al. |
| 9,729,281 B2 | 8/2017 | Hadani et al. |
| 2001/0031022 A1 | 10/2001 | Petrus et al. |
| 2001/0033614 A1 | 10/2001 | Hudson |
| 2001/0046205 A1 | 11/2001 | Easton et al. |
| 2002/0001308 A1 | 1/2002 | Heuer |
| 2002/0034191 A1 | 3/2002 | Shattil |
| 2002/0104058 A1 * | 8/2002 | Rappaport ............ H04L 1/0057 714/784 |
| 2002/0136276 A1 * | 9/2002 | Franceschini ........ H04L 1/0041 375/148 |
| 2002/0181388 A1 | 12/2002 | Jain et al. |
| 2002/0181390 A1 | 12/2002 | Mody et al. |
| 2002/0181607 A1 | 12/2002 | Izumi |
| 2002/0194570 A1 * | 12/2002 | Birru ................. H04N 21/2383 714/792 |
| 2003/0073464 A1 | 4/2003 | Giannakis et al. |
| 2003/0185295 A1 | 10/2003 | Yousef |
| 2003/0235147 A1 | 12/2003 | Walton et al. |
| 2004/0044715 A1 | 3/2004 | Aldroubi et al. |
| 2004/0086027 A1 | 5/2004 | Shattil |
| 2004/0174812 A1 | 9/2004 | Murakami et al. |
| 2004/0189581 A1 | 9/2004 | Sako et al. |
| 2004/0218523 A1 | 11/2004 | Varshney et al. |
| 2005/0157778 A1 | 7/2005 | Trachewsket et al. |
| 2005/0157820 A1 | 7/2005 | Wongwirawat et al. |
| 2005/0180517 A1 | 8/2005 | Abe |
| 2005/0207334 A1 | 9/2005 | Hadad |
| 2005/0251844 A1 | 11/2005 | Martone et al. |
| 2006/0008021 A1 | 1/2006 | Bonnet |
| 2006/0039270 A1 | 2/2006 | Strohmer et al. |
| 2007/0014272 A1 | 1/2007 | Palanki et al. |
| 2007/0038691 A1 | 2/2007 | Candes et al. |
| 2007/0078661 A1 | 4/2007 | Sriram et al. |
| 2007/0104283 A1 | 5/2007 | Han et al. |
| 2007/0110131 A1 | 5/2007 | Guess et al. |
| 2007/0140320 A1 * | 6/2007 | Banna ................. H04B 1/7101 375/148 |
| 2007/0211952 A1 | 9/2007 | Faber et al. |
| 2007/0237181 A1 | 10/2007 | Cho et al. |
| 2007/0253465 A1 | 11/2007 | Muharemovic et al. |
| 2007/0253504 A1 | 11/2007 | Hasegawa |
| 2008/0043857 A1 | 2/2008 | Dias et al. |
| 2008/0117999 A1 | 5/2008 | Kadous et al. |
| 2008/0165873 A1 | 7/2008 | Ghosh et al. |
| 2008/0186843 A1 | 8/2008 | Ma et al. |
| 2008/0187062 A1 | 8/2008 | Pan et al. |
| 2008/0232504 A1 | 9/2008 | Ma et al. |
| 2008/0250294 A1 * | 10/2008 | Ngo ..................... H04L 1/007 714/752 |
| 2008/0310383 A1 | 12/2008 | Kowalski |
| 2009/0080403 A1 | 3/2009 | Hamdi |
| 2009/0092259 A1 | 4/2009 | Jot et al. |
| 2009/0103593 A1 | 4/2009 | Bergamo |
| 2009/0122854 A1 | 5/2009 | Zhu et al. |
| 2009/0161804 A1 | 6/2009 | Chrabieh et al. |
| 2009/0204627 A1 | 8/2009 | Hadani |
| 2009/0222226 A1 | 9/2009 | Baraniuk et al. |
| 2009/0276680 A1 * | 11/2009 | Chiu .................. G06F 11/1068 714/752 |
| 2009/0303961 A1 | 12/2009 | Popovic et al. |
| 2010/0001901 A1 | 1/2010 | Baraniuk et al. |
| 2010/0008432 A1 | 1/2010 | Kim et al. |
| 2010/0014558 A1 * | 1/2010 | Nieto ................... H04B 14/023 375/130 |
| 2010/0027608 A1 | 2/2010 | Priotti |
| 2010/0080312 A1 | 4/2010 | Moffatt et al. |
| 2010/0111138 A1 | 5/2010 | Hosur et al. |
| 2010/0142476 A1 | 6/2010 | Jiang et al. |
| 2010/0187914 A1 | 7/2010 | Rada et al. |
| 2010/0238787 A1 | 9/2010 | Guey |
| 2010/0254484 A1 | 10/2010 | Hamaguchi et al. |
| 2010/0277308 A1 | 11/2010 | Potkonjak |
| 2010/0303136 A1 | 12/2010 | Ashikhmin et al. |
| 2010/0322349 A1 | 12/2010 | Lee et al. |
| 2011/0007789 A1 | 1/2011 | Garmany |
| 2011/0013505 A1 | 1/2011 | Dyson |
| 2011/0096814 A1 * | 4/2011 | Wu ..................... H04L 27/2604 375/219 |

(56) References Cited

U.S. PATENT DOCUMENTS

| | | |
|---|---|---|
| 2011/0110532 A1 | 5/2011 | Svendsen |
| 2011/0116489 A1 | 5/2011 | Grandhi |
| 2011/0116516 A1 | 5/2011 | Hwang et al. |
| 2011/0126071 A1 | 5/2011 | Han et al. |
| 2011/0131463 A1 | 6/2011 | Gunnam |
| 2011/0216808 A1 | 9/2011 | Tong et al. |
| 2011/0286502 A1 | 11/2011 | Adachi et al. |
| 2011/0287778 A1 | 11/2011 | Levin et al. |
| 2011/0292971 A1 | 12/2011 | Hadani et al. |
| 2011/0293030 A1 | 12/2011 | Rakib et al. |
| 2011/0299379 A1 | 12/2011 | Sesia et al. |
| 2011/0305267 A1 | 12/2011 | Rius et al. |
| 2012/0021769 A1 | 1/2012 | Lindoff et al. |
| 2012/0051457 A1 | 3/2012 | Ma et al. |
| 2012/0140716 A1 | 6/2012 | Baldemair et al. |
| 2012/0170680 A1 | 7/2012 | Stern |
| 2012/0170684 A1 | 7/2012 | Yim et al. |
| 2012/0201322 A1 | 8/2012 | Rakib et al. |
| 2012/0213098 A1 | 8/2012 | Sun |
| 2012/0235795 A1 | 9/2012 | Liao et al. |
| 2012/0269201 A1 | 10/2012 | Atungsiri et al. |
| 2012/0272117 A1 | 10/2012 | Stadelmeier et al. |
| 2012/0320994 A1 | 12/2012 | Loghin et al. |
| 2013/0021977 A1 | 1/2013 | Yang et al. |
| 2013/0058390 A1 | 3/2013 | Haas et al. |
| 2013/0077579 A1 | 3/2013 | Cho et al. |
| 2013/0083661 A1 | 4/2013 | Gupta et al. |
| 2013/0121497 A1 | 5/2013 | Smaragdis et al. |
| 2013/0130751 A1* | 5/2013 | Vummintala ..... H04W 28/0263 455/574 |
| 2013/0230010 A1 | 9/2013 | Kim et al. |
| 2013/0260787 A1 | 10/2013 | Hashimoto |
| 2013/0279627 A1 | 10/2013 | Wu et al. |
| 2013/0311848 A1 | 11/2013 | Purohit |
| 2013/0315133 A1* | 11/2013 | Wang ..... H04W 40/22 370/315 |
| 2014/0143639 A1 | 5/2014 | Loghin et al. |
| 2014/0161154 A1 | 6/2014 | Hadani et al. |
| 2014/0169385 A1 | 6/2014 | Hadani et al. |
| 2014/0169406 A1 | 6/2014 | Hadani et al. |
| 2014/0169433 A1 | 6/2014 | Hadani et al. |
| 2014/0169436 A1 | 6/2014 | Hadani et al. |
| 2014/0169437 A1 | 6/2014 | Hadani et al. |
| 2014/0169441 A1 | 6/2014 | Hadani et al. |
| 2014/0247803 A1 | 9/2014 | Arambepola et al. |
| 2014/0348252 A1 | 11/2014 | Siohan et al. |
| 2014/0364128 A1 | 12/2014 | Lee et al. |
| 2015/0117395 A1 | 4/2015 | Hadani et al. |
| 2015/0326273 A1 | 11/2015 | Rakib et al. |
| 2015/0327085 A1 | 11/2015 | Hadani et al. |
| 2015/0349995 A1* | 12/2015 | Zhang ..... H04L 5/0048 375/295 |
| 2015/0382231 A1 | 12/2015 | Jabbar et al. |
| 2016/0043835 A1 | 2/2016 | Hadani et al. |
| 2016/0135132 A1 | 5/2016 | Donepudi et al. |
| 2016/0182269 A1 | 6/2016 | Hadani et al. |
| 2016/0191217 A1 | 6/2016 | Hadani et al. |
| 2016/0191280 A1 | 6/2016 | Hadani et al. |
| 2016/0254889 A1 | 9/2016 | Shattil |
| 2016/0277225 A1 | 9/2016 | Frenne et al. |
| 2016/0309345 A1 | 10/2016 | Tehrani et al. |
| 2016/0380743 A1 | 12/2016 | Rakib |
| 2016/0381576 A1 | 12/2016 | Hadani et al. |
| 2017/0012749 A1 | 1/2017 | Rakib et al. |
| 2017/0012810 A1 | 1/2017 | Rakib et al. |
| 2017/0019238 A1* | 1/2017 | Sharma ..... H04B 1/54 |
| 2017/0019297 A1 | 1/2017 | Rakib |
| 2017/0033899 A1 | 2/2017 | Rakib et al. |
| 2017/0040711 A1 | 2/2017 | Rakib et al. |
| 2017/0078054 A1 | 3/2017 | Hadani et al. |
| 2017/0099122 A1 | 4/2017 | Hadani et al. |
| 2017/0099607 A1 | 4/2017 | Hadani et al. |
| 2017/0149594 A1 | 5/2017 | Rakib |
| 2017/0149595 A1 | 5/2017 | Rakib et al. |
| 2017/0201354 A1 | 7/2017 | Hadani et al. |
| 2017/0207817 A1 | 7/2017 | Hadani et al. |
| 2017/0222700 A1 | 8/2017 | Hadani et al. |
| 2017/0230215 A1 | 8/2017 | Rakib et al. |
| 2017/0244524 A1 | 8/2017 | Hadani et al. |
| 2019/0173617 A1* | 6/2019 | Kons ..... H04L 1/0045 |

FOREIGN PATENT DOCUMENTS

| | | |
|---|---|---|
| CN | 101939935 A | 1/2011 |
| EP | 1432168 A1 | 6/2004 |
| JP | 2011127910 | 6/2011 |
| WO | 2007004297 | 1/2007 |
| WO | 2011137699 A1 | 11/2011 |
| WO | 2011150315 | 12/2011 |
| WO | 2013148546 | 10/2013 |
| WO | 2014004585 | 1/2014 |
| WO | 2016014596 | 1/2016 |
| WO | 2016014598 | 1/2016 |
| WO | 2016176642 | 11/2016 |
| WO | 2016183230 | 11/2016 |
| WO | 2016183240 | 11/2016 |
| WO | 2016209848 | 12/2016 |
| WO | 2017003952 | 1/2017 |
| WO | 2017011478 | 1/2017 |

OTHER PUBLICATIONS

Ishizaki et al., Forward link capacity evaluation for W-CDMA with amplitude limited and forward error correction, IEEE, vol. 1, Conference Paper, pp. 439-443. (Year: 2002).*

Office Action for U.S. Appl. No. 13/117,119, dated Aug. 5, 2013, 5 pages.

Notice of Allowance for U.S. Appl. No. 13/117,119, dated Feb. 28, 2014, 13 pages.

Banelli, P. et al., "Modulation Formats and Waveforms for 5G Networks: Who Will Be the Heir of OFDM?," IEEE Signal Processing Magazine, vol. 81, pp. 80-93, Nov. 2014.

El Hattachi, R. et al., "NGMN 5G Initiative White Paper," NGMN Alliance, Feb. 17, 2015. [Online]. Available: https://www.ngmn.org/uploads/media/NGMN_5G_White_Paper_V1_0.pdf, 125 pages.

Rusek, F. et al., "Scaling Up MIMO, Opportunities and Challenges with Very Large Arrays," IEEE Signal Processing Magazine, pp. 40-60 (2013).

Vodafone, "Cellular Internet of Things: Architectural Aspects," RP-150869, 3GPP RAN#68, Malmo, Sweden (Jun. 9, 2015), 19 pages.

Supplementary European Search Report for European Application No. 11787483.4, dated Sep. 9, 2014, 6 pages.

International Search Report and Written Opinion for International Application No. PCT/US2011/038302, dated Nov. 15, 2011, 8 pages.

International Preliminary Report on Patentability for International Application No. PCT/US2011/038302, dated Dec. 4, 2012, 7 pages.

Office Action for U.S. Appl. No. 13/117,124, dated Feb. 22, 2013, 7 pages.

Notice of Allowance for U.S. Appl. No. 13/117,124, dated Aug. 8, 2013, 10 pages.

Office Action for U.S. Appl. No. 14/605,957, dated Jun. 22, 2017, 6 pages.

Supplementary European Search Report for European Application No. 13809004.8, dated Apr. 14, 2016, 8 pages.

Communication Pursuant to Article 94(3) EPC for European Application No. 13809004.8, dated Feb. 17, 2017, 5 pages.

Notice of Allowance for U.S. Appl. No. 13/927,087, dated Feb. 25, 2015, 9 pages.

Office Action for U.S. Appl. No. 13/927,087, dated Nov. 12, 2014, 14 pages.

Gurevich, S. et al. "Group Representation Design of Digital Signals and Sequences," S.W. Golomb et al. (eds.), Seta 2008, LNCS 5203, pp. 153-166, Springer-Verlag Berlin Heidelberg (2008).

International Search Report and Written Opinion for International Application No. PCT/US2013/047723, dated Oct. 29, 2013, 17 pages.

(56) References Cited

OTHER PUBLICATIONS

International Preliminary Report on Patentability for International Application No. PCT/US2013/047723, dated Dec. 31, 2014, 15 pages.
Notice of Allowance for U.S. Appl. No. 13/927,088, dated Feb. 18, 2015, 7 pages.
Office Action for U.S. Appl. No. 13/927,088, dated Nov. 28, 2014, 13 pages.
Notice of Allowance for U.S. Appl. No. 13/927,086, dated Dec. 26, 2014, 8 pages.
Supplemental Notice of Allowability for U.S. Appl. No. 13/927,086, dated Mar. 19, 2015, 4 pages.
Office Action for U.S. Appl. No. 13/927,086, dated Oct. 14, 2014, 10 pages.
Office Action for U.S. Appl. No. 13/927,089, dated Dec. 24, 2014, 13 pages.
Office Action for U.S. Appl. No. 13/927,089, dated Aug. 14, 2015, 7 pages.
Supplemental Notice of Allowability for U.S. Appl. No. 13/927,091, dated Jun. 11, 2015, 4 pages.
Notice of Allowance for U.S. Appl. No. 13/927,091, dated Apr. 24, 2015, 8 pages.
Office Action for U.S. Appl. No. 13/927,091, dated Jan. 27, 2015, 15 pages.
Office Action for U.S. Appl. No. 13/927,092, dated Oct. 8, 2014, 5 pages.
Notice of Allowance for U.S. Appl. No. 13/927,092, dated Oct. 24, 2014, 7 pages.
Office Action for U.S. Appl. No. 13/927,095, dated Apr. 30, 2015, 11 pages.
Office Action for U.S. Appl. No. 13/927,095, dated Nov. 4, 2015, 9 pages.
Office Action for U.S. Appl. No. 13/927,095, dated Jun. 1, 2016, 10 pages.
Office Action for U.S. Appl. No. 14/717,886, dated Apr. 19, 2016, 10 pages.
Office Action for U.S. Appl. No. 14/709,377, dated Dec. 11, 2015, 12 pages.
Office Action for U.S. Appl. No. 14/709,377, dated Jul. 13, 2016, 17 pages.
Examination Report No. 1 for Australian Application No. 2013239970, dated Dec. 8, 2015, 3 pages.
"AT&T Annual Report 2014," Opening Our Network [Online]. Retrieved from the Internet: Sep. 22, 2016. <URL: http://www.att.com/Investor/ATT_Annual/2014/att_introduces_new_concepts_for_telecom_network.html>, 5 pages.
Catt, "UL ACK/NACK transmission methods for LTE-A," 3GPP TSG RAN WG1 Meeting #60bis, R1-102453, Beijing, China, Apr. 12-16, 2010, 8 pages.
Toskala, A. et al., "Physical Layer," Chapter 5 In: "LTE for UMTS: OFDMA and SC-FDMA Based Radio Access," Holma, H. et al. (eds.), John Wiley & Sons, Ltd., United Kingdom, 2009, pp. 83-135.
Mecklenbrauker, W., "A Tutorial on Non-Parametric Bilinear Time-Frequency Signal Representations," In: Time and Frequency Representation of Signals and Systems, Longo, G. et al. (eds.), Springer-Verlag Wien, vol. 309, pp. 11-68 (1989).
Nehorai, A. et al., "MURI: Adaptive waveform design for full spectral dominance (2005-2010)," AFOSR FA9550-05-1-0443, Final Report, [online], Mar. 11, 2011 Retrieved on May 11, 2013, Retrieved from the Internet <URL: http://oai.dtic.mil/oai/oai?verb=getRecord&metadataPrefix=html&identifier=ADA565420>, 103 pages.
Office Action for Japanese Application No. 2015-518647, dated Jul. 7, 2015, 10 pages.
Office Action for U.S. Appl. No. 14/754,596, dated Apr. 19, 2016, 18 pages.
Office Action for U.S. Appl. No. 14/809,129, dated Jul. 19, 2016, 5 pages.
Office Action for U.S. Appl. No. 15/617,962, dated Sep. 6, 2017, 10 pages.
International Search Report and Written Opinion for International Application No. PCT/US2016/050825, dated Feb. 8, 2017, 12 pages.
International Search Report and Written Opinion for International Application No. PCT/US2016/052524, dated Dec. 20, 2016, 8 pages.
Office Action for U.S. Appl. No. 15/374,995, dated Aug. 7, 2017, 6 pages.
International Search Report and Written Opinion for International Application No. PCT/US2017/025797, dated Jun. 21, 2017, 6 pages.
International Search Report and Written Opinion for International Application No. PCT/US2016/030259, dated Aug. 4, 2016, 13 pages.
Office Action for U.S. Appl. No. 15/152,464, dated Apr. 6, 2017, 10 pages.
Examination Report No. 1 for Australian Application No. 2013280487, dated May 2, 2016, 3 pages.
International Search Report and Written Opinion for International Application No. PCT/US2016/031928, dated Oct. 7, 2016, 10 pages.
Office Action for U.S. Appl. No. 15/188,946, dated May 8, 2017, 14 pages.
International Search Report and Written Opinion for International Application No. PCT/US2016/038584, dated Sep. 26, 2016, 8 pages.
Office Action for U.S. Appl. No. 15/187,668, dated Feb. 16, 2017, 6 pages.
International Search Report and Written Opinion for International Application No. PCT/US2016/031909, dated Aug. 11, 2016, 13 pages.
Office Action for U.S. Appl. No. 15/194,494, dated May 5, 2017, 16 pages.
International Search Report and Written Opinion for International Application No. PCT/US2016/039662, dated Nov. 29, 2016, 14 pages.
Office Action for U.S. Appl. No. 15/436,653, dated Jun. 2, 2017, 10 pages.
Office Action for U.S. Appl. No. 15/208,545, dated Aug. 21, 2017, 15 pages.
International Search Report and Written Opinion for International Application No. PCT/US2016/041940, dated Oct. 20, 2016, 8 pages.
Supplementary European Search Report for European Application No. 13768150.8, dated Oct. 30, 2015, 7 pages.
International Search Report and Written Opinion for International Application No. PCT/US2013/033652, dated Jun. 12, 2013, 8 pages.
International Search Report and Written Opinion for International Application No. PCT/US2015/041417, dated Oct. 1, 2015, 7 pages.
Office Action for U.S. Appl. No. 14/805,407, dated Dec. 14, 2016, 7 pages.
International Search Report and Written Opinion for International Application No. PCT/US2015/041420, dated Oct. 1, 2015, 6 pages.
International Search Report and Written Opinion for PCT Application No. PCT/US2017/046634, dated Dec. 7, 2017, 10 pages.
International Search Report and Written Opinion for PCT Application No. PCT/US2018/17090, dated Jun. 14, 2018. 13 pages.
Office Action for U.S. Appl. No. 16/273,649, filed Feb. 12, 2019, dated Jan. 3, 2020.
Office Action for U.S. Appl. No. 16/273,649, filed Feb. 12, 2019, dated Jul. 29, 2020.
Okabe et al., 10-Gbps forward error correction system for 120-GHz-band wireless transmission, IEEE, Conference Paper, pp. 472-475 (Year: 2010).
Yiqing Zhou et al.: "OFCDM: a promising broadband wireless access technique", IEEE Communications Magazine, IEEE Service Center, Piscataway, US, vol. 46, No. 3, Mar. 1, 2008 (Mar. 1, 2008), pp. 38-49, XP011225377.
Lin Zhang Et Al: "Hierarchical MMSE linear equalization for multilayer coded modulation", Communications, Circuits and Systems, 2009. ICCCAS 2009. International Conference On, IEEE, Piscataway, NJ, USA, Jul. 23, 2009 (Jul. 23, 2009), pp. 164-168.

(56) References Cited

OTHER PUBLICATIONS

Mei Chen et al.: "Multilevel Coding for Nonlinear ISI Channels" IEEE Transactions on Information Theory, IEEE Press, USA, vol. 55, No. 5, May 1, 2009 (May 1, 2009), pp. 2292-2303.
U. Wachsmann et al: Multilevel codes: theoretical concepts and practical design rules IEEE Transactions on Information Theory, vol. 45, No. 5, Jul. 1, 1999 (Jul. 1, 1999), pp. 1361-1391.
Extended European Search Report, 17840382.0, dated Mar. 20, 2020, 15 pages.

* cited by examiner

ITERATIVE MULTI-LEVEL EQUALIZATION AND DECODING

PRIORITY CLAIM

This patent document is a continuation-in-part of PCT Application No. PCT/US2017/046634, filed Aug. 11, 2017 which claims the benefits and priority of U.S. Provisional Patent Application No. 62/374,585, filed Aug. 12, 2016, and to U.S. Provisional Patent Application No. 62/379,184, filed Aug. 24, 2016, all entitled "ITERATIVE MULTI-LEVEL EQUALIZATION AND DECODING." The entire content of the before-mentioned patent applications is incorporated by reference as part of the disclosure of this application.

TECHNICAL FIELD

The present document relates to wireless communication, and more particularly, transmission and reception of multi-level constellation signals.

BACKGROUND

Due to an explosive growth in the number of wireless user devices and the amount of wireless data that these devices can generate or consume, current wireless communication networks are fast running out of bandwidth to accommodate such a high growth in data traffic and provide high quality of service to users.

Various efforts are underway in the telecommunication industry to come up with next generation of wireless technologies that can keep up with the demand on performance of wireless devices and networks.

SUMMARY

This document discloses techniques for transmission and reception of signals with improved error-rate performance, using multi-level constellations symbols.

In one example aspect, a method of wireless signal transmission is disclosed. The method includes receiving information bits for transmission, segmenting the information bits into a stream of segments, applying a corresponding forward error correction (FEC) code to each of the stream of segments, combining the streams to generate a stream of symbols, processing the stream of symbols to generate a waveform, and transmitting the waveform over a communication medium.

In another example aspect, a wireless communication method, implemented at a receiver-side is disclosed. The method include performing channel equalization on the signal to generate a channel equalized signal, logically dividing the channel equalized signal into a first number of segments, wherein the number of segment is equal to a second number of segments used at a transmitter-side to generate the signal, demodulating and symbol de-mapping the channel equalization signal in successive steps such that each step operates to recover one or more bits of one of the number of the segments to generate a demodulated bit-stream, processing the demodulated bitstream to generate information related to the bits of the signal, and providing a feedback signal to the channel equalization operation based on the processing of the demodulated bitstream. The order in which the successive steps are performed depends on a reliability of success of recovering the one or more bits in each of the successive steps.

In another example aspect, a wireless communication apparatus that includes a processor is disclosed. The apparatus is configured to implement one of the methods described herein.

These, and other, features are described in this document.

DESCRIPTION OF THE DRAWINGS

Drawings described herein are used to provide a further understanding and constitute a part of this application. Example embodiments and illustrations thereof are used to explain the technology rather than limiting its scope.

DETAILED DESCRIPTION

To make the purposes, technical solutions and advantages of this disclosure more apparent, various embodiments are described in detail below with reference to the drawings. Unless otherwise noted, embodiments and features in embodiments of the present document may be combined with each other.

Section headings are used in the present document, including the appendices, to improve readability of the description and do not in any way limit the discussion to the respective sections only.

Figure 1:
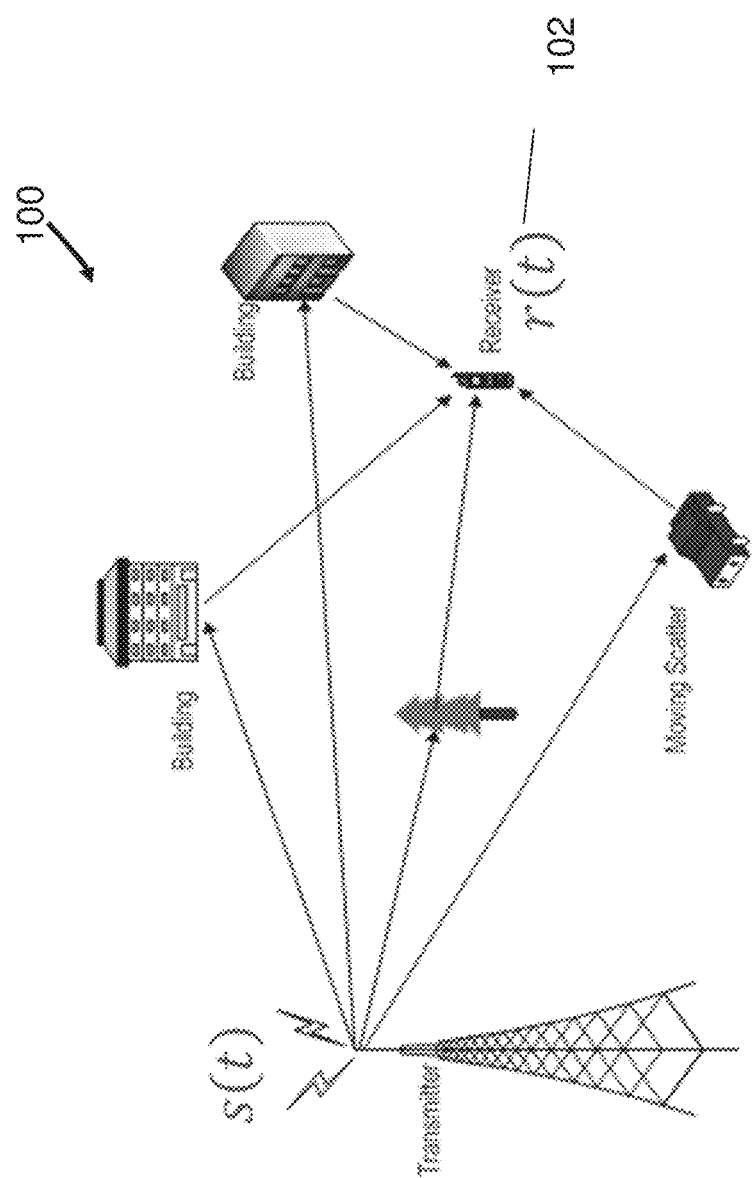
FIG. 1 shows an example communication network.

FIG. 1 shows an example communication network 100 in which the disclosed technologies can be implemented. The network 100 may include a base station transmitter that transmits wireless signals s(t) (downlink signals) to one or more receivers 102, the received signal being denoted as r(t), which may be located in a variety of locations, including inside or outside a building and in a moving vehicle. The receivers may transmit uplink transmissions to the base station, typically located near the wireless transmitter. The technology described herein may be implemented at a receiver 102, or by the receiving function of the base station.

Figure 2:
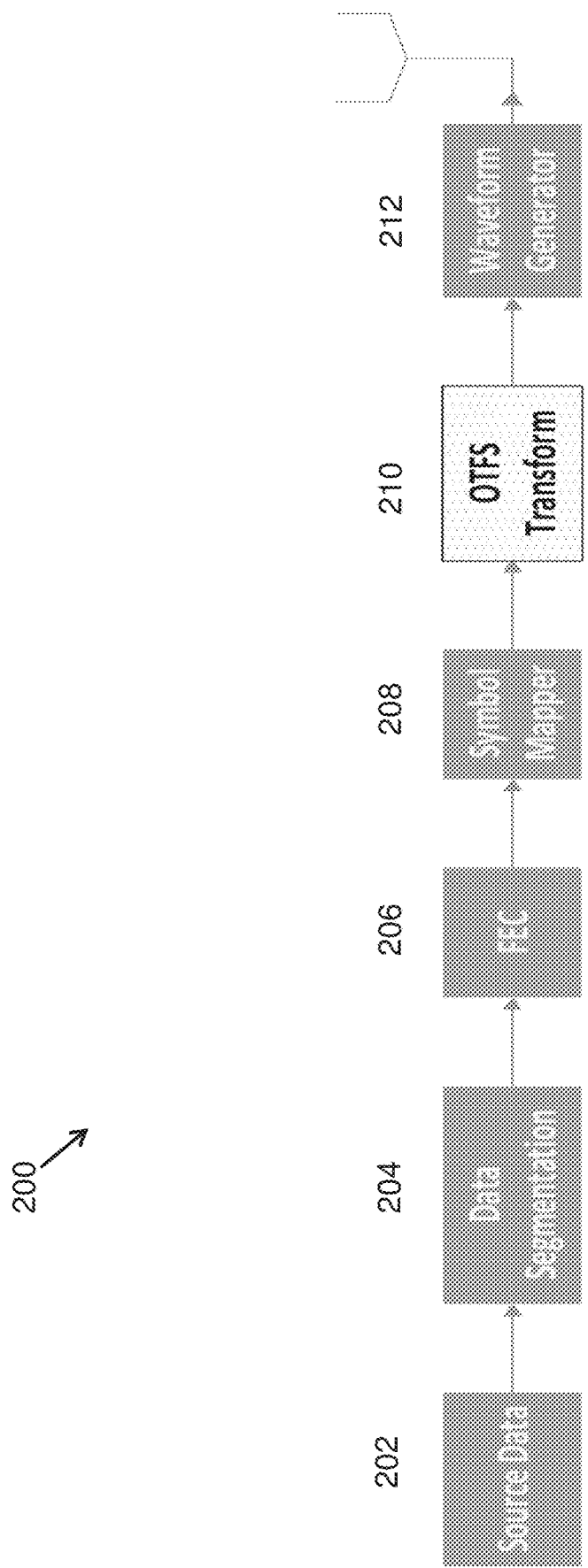
FIG. 2 is a block diagram showing an example of a transmission system.

A typical wireless signal transmission system usually may include a transmit chain 200, as shown in FIG. 2. Source data 202 is segmented into blocks (204), which are encoded by a Forward-Error-Correction (FEC) code of rate R into codewords (206). These codewords are segmented (208) into groups of q bits where each group is mapped to a constellation symbol (such as M-QAM, where $2^q=M$). These symbols may be transformed by an orthogonal time frequency space (OTFS) transform (210) and then used for the generation of the transmission waveform (212). In some embodiments, an orthogonal frequency division multiplexing (OFDM) technique may be used in 210. Alternatively, modulation based on other modulations schemes such as dispersed OTFS or a general M-dimensional transform may also be possible.

In transmit chain 200, all the source bits have (almost) equal protection by the FEC code, but the coded bits, which are mapped into different positions in the constellation symbol's label, do not typically have equal protection. Some of the bits in the constellation label may be more reliable than other bits (have lower probability of error). For example, in some standard constellation mappings, such as Gray mapping, the Most-Significant-Bits (MSBs) are typically more reliable than the Least-Significant-Bits (LSBs).

Described herein are alternative method for data segmentation and encoding along with its matching iterative receiver, which is advantageous in terms of error-rate performance.

Multi-Level Data Segmentation and Encoding

Figure 3:
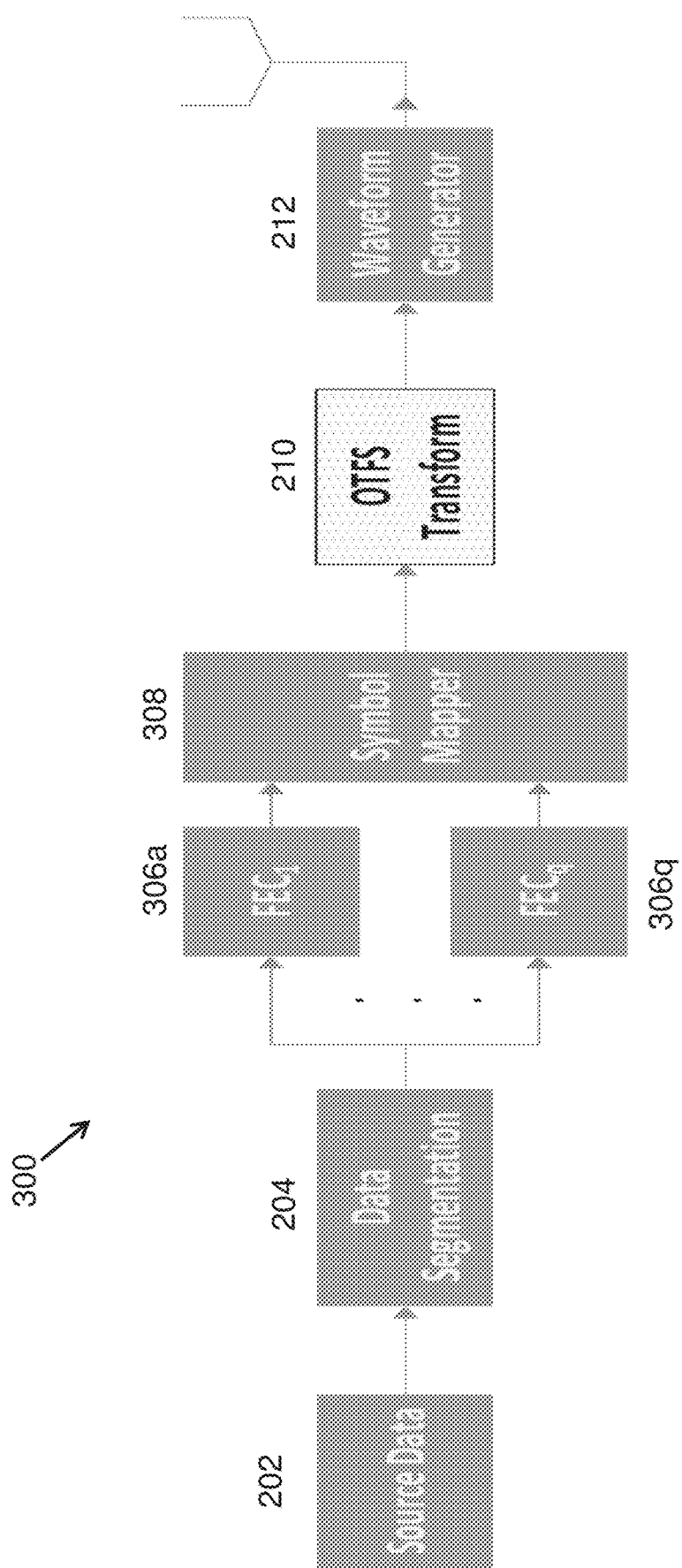
FIG. 3 is a block diagram showing an example of a multi-level transmission system.

FIG. 3 depicts an example of a transmit chain 300 that uses multi-level data segmentation and encoding. In the scheme implemented by the transmit chain 300, shown in FIG. 3, the data is segmented into q multiple blocks of different sizes and encoded in q different levels by multiple FEC codes (306a to 306q) of different rates $R_1, R_2, \ldots, R_q$. In the simplest case, each FEC output is used to map a specific bit in each constellation symbol. For example, 8-QAM may be encoded with 3 levels using 3 different FEC codes. Their output maps the MSB, middle bit and LSB of the constellation symbol's label. In some embodiments, different sets of the multiple FEC codes (306a to 306q), depending on the portion of data packet being sent, may be used. For example, a first FEC code group may be used for headers, while a second FEC code group may be used for payload of the packet being transmitted.

In various embodiments, the number of levels may be smaller than $\log_2 M$ and each FEC may be connected to more than one bit in the constellation label. For example, in constellation mappings (308) where the real part of the complex constellation is independent of the imaginary part, pairs of constellation bits (one mapped to the real and one mapped to the imaginary) may be encoded together.

To achieve the best error-rate performance, the different FEC code rates may be optimally selected along with the choice of the constellation mapping.

Iterative Equalization & Decoding of Multi-Level Encoded Symbols

Figure 4:
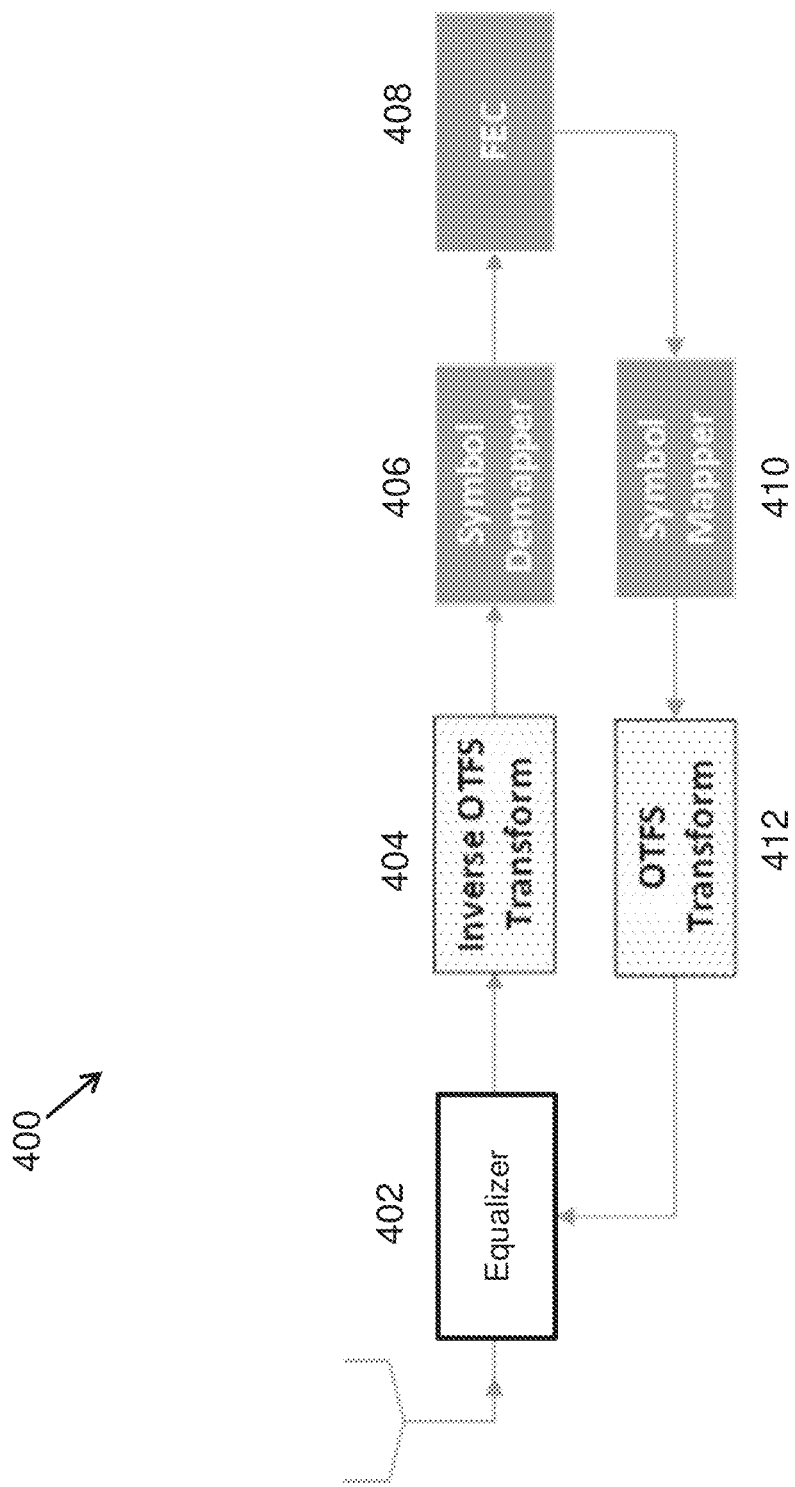
FIG. 4 shows a block diagram of an example iterative receiver apparatus.

In general, iterative receivers exchange extrinsic information between the equalizer and the FEC decoder to achieve close to optimal performance, as shown in FIG. 4 for an OTFS receiver 400. The extrinsic information may include a priori knowledge of which transmission resources (e.g., time slots of subcarriers) use which particular FEC. For example, the equalizer 402 uses prior information on the data symbols coming from the FEC feedback path to improve the equalization of the symbols. This feedback path comprises a symbol mapper 410 and OTFS transformation module 412. Then, these symbols are converted to bit likelihoods that are FEC decoded. Several iterations are performed until all the source data is decoded correctly, or until some other stopping criteria is met. An inverse OTFS transform module 404 may apply inverse OTFS transform and a symbol demapper 406 may recover bits from modulation symbols.

Compared to other techniques described next, the error-rate performance of the scheme 400 may be degraded. One reason for the degradation may be because of the mixture of bits with different level of reliability in every FEC codeword that is being decoded. The constellation bits with low reliability make it harder for the FEC decoder to converge to the correct codeword and therefore, the feedback to the equalizer has less information to improve the equalization.

Figure 5:
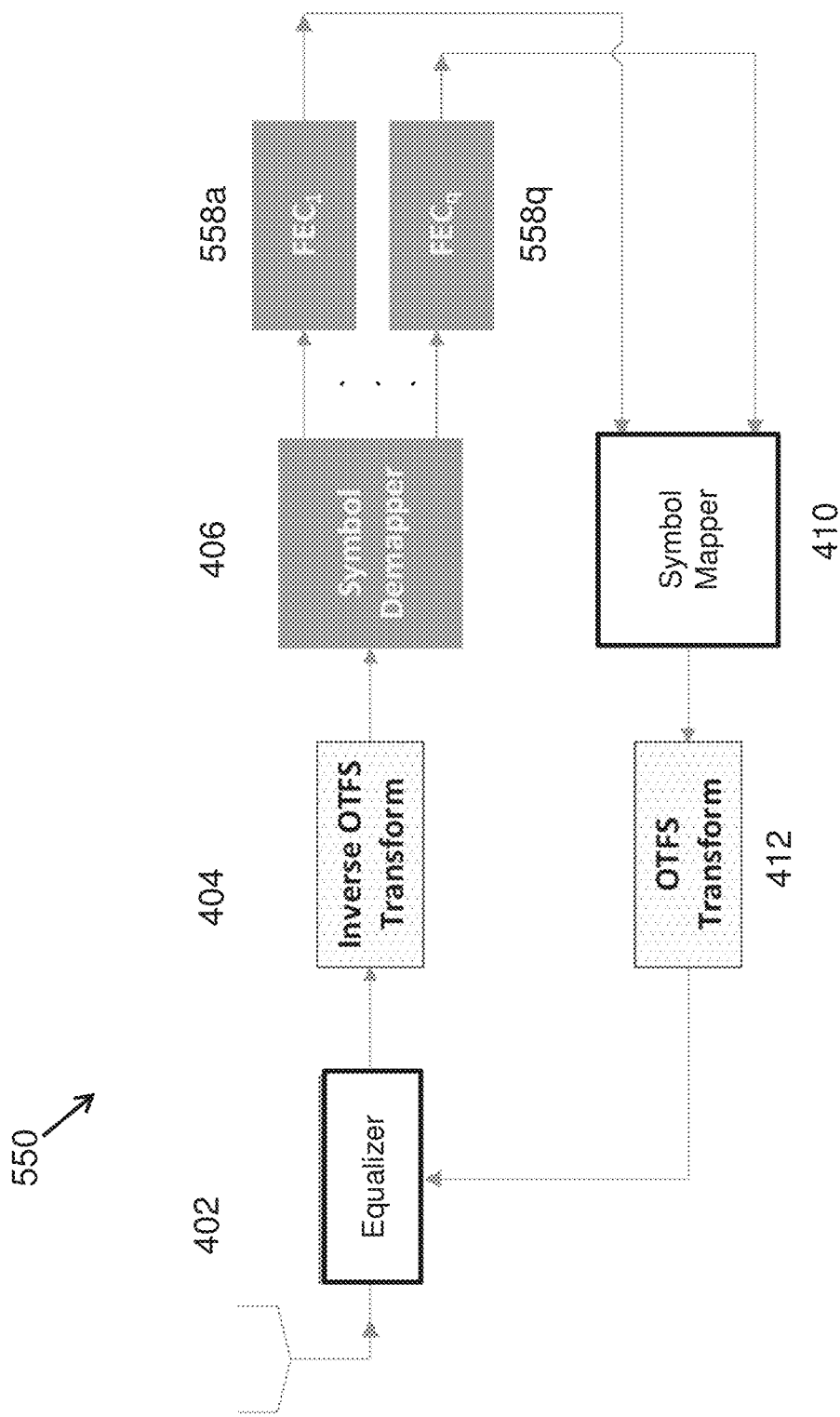
FIG. 5 shows a block diagram of an example iterative receiver apparatus that uses multi-level decoding.

When multi-level encoding is applied at the transmitter (e.g., as shown in FIG. 3), the iterative receiver 550, in each decoding iteration, decodes only a part of the constellation bits. It typically starts with the most reliable bits and then proceeds in the next iterations to less reliable ones. This scheme, shown in FIG. 5, allows the equalizer to receive in earlier iterations priors, which are dominant from the constellation symbols point of view and better improve the equalization. When the FEC has successfully decoded one level, it switches to decode the next one. The receiver continues to iterate until all levels have been decoded successfully or until some other stopping criteria is met. The most reliable bits are often bits that are used to decide the "macro" region within the constellation map where a symbol lies—e.g., the quadrant in which a constellation symbol of a 4 or 8 QAM signal lies, followed by sub-quadrant within the quadrant, and so on. Thus, as shown in FIG. 5 the received signal may be equalized by the equalizer 402. In the forward path, the equalized signal may undergo an inverse OTFS transform (404), and the symbols from the resulting transformed signal may be demapped for decoding by multiple different FECs FEC1 to FECq (modules 558a to 558q). In the feedback path, the decoded symbol (bit) outputs of the FEC modules may be mapped to symbols (410) and transformed into OTFS domain signals (symbols) for feedback to the equalizer 402. As described above, in some implementations, different forward error correction codes are used for symbols from the multiple symbols corresponding to header and payload portions of the bits from the signal.

Figure 6:
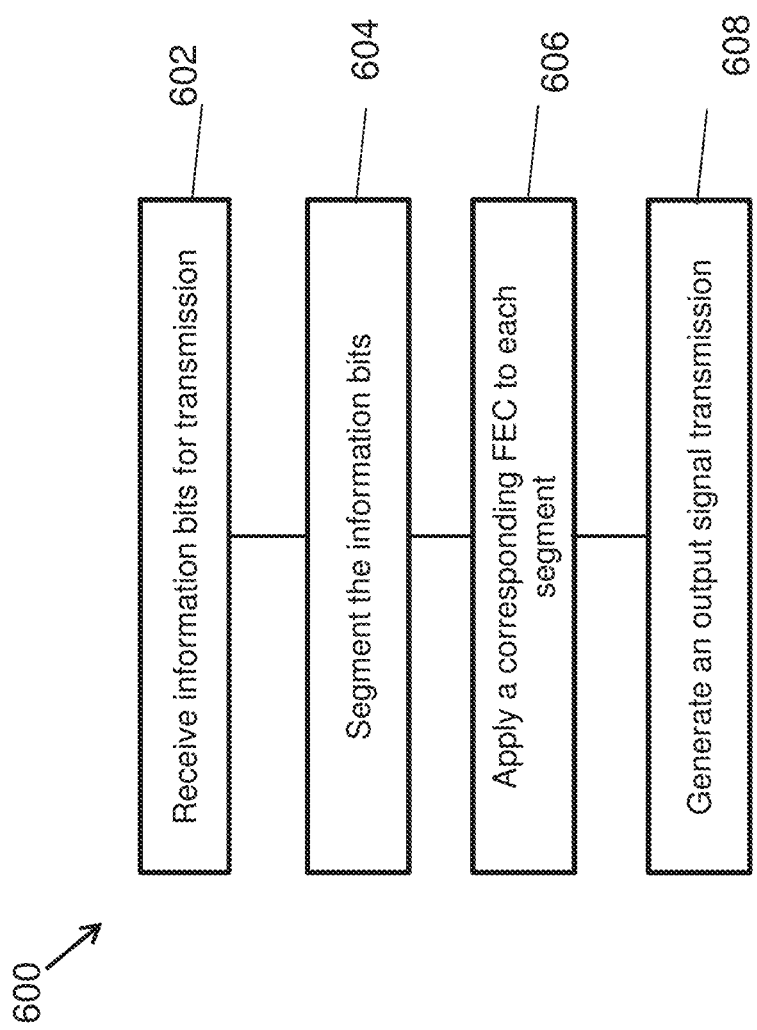
FIG. 6 shows a flowchart of an example wireless communication transmission method.
Figure 7:
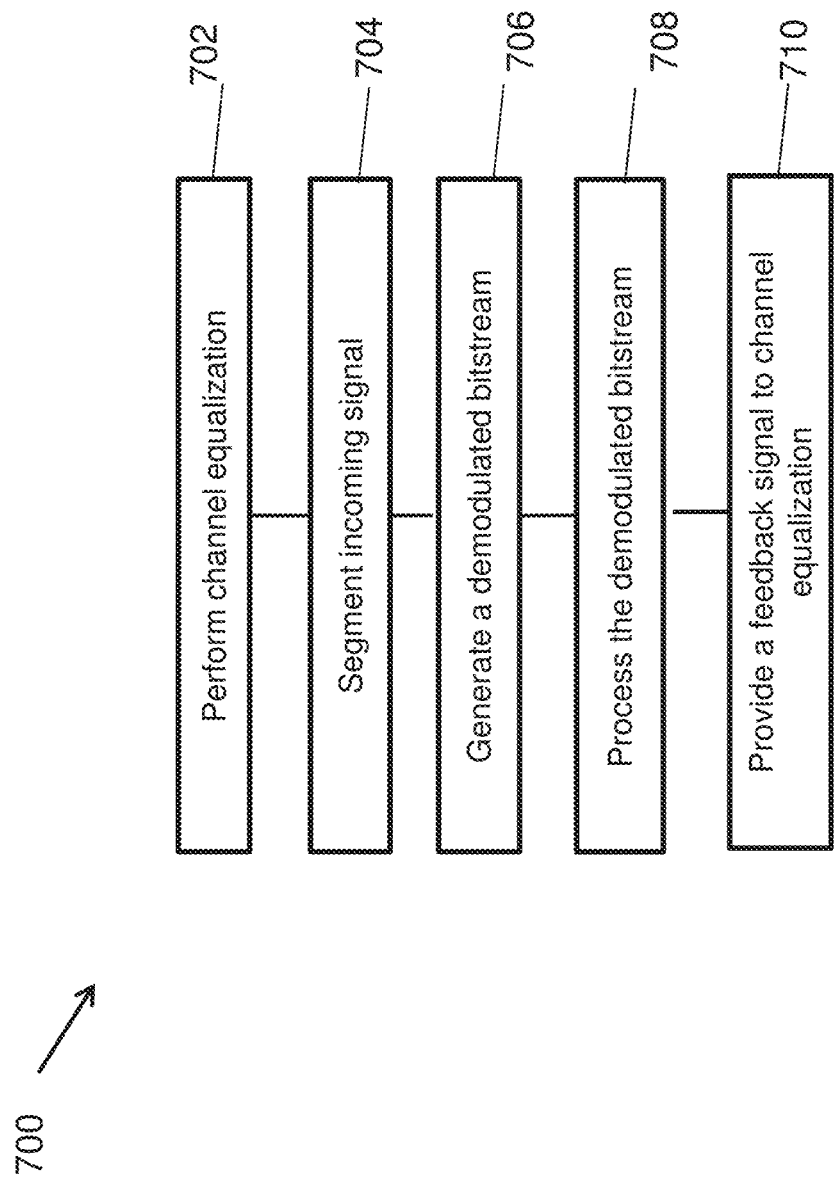
FIG. 7 shows a flowchart of an example wireless communication reception method.

FIG. 6 shows a flowchart representation of an example method 600 of wireless signal transmission is disclosed. The method includes receiving information bits for transmission (602), segmenting the information bits into a stream of segments (604), applying a corresponding forward error correction (FEC) code to each of the stream of segments and combining outputs of the FECs to generate a stream of symbols (606), and generating an output signal for transmission (608). The output signal generation operation 608 may include processing the stream of symbols to generate a waveform, and transmitting the waveform over a communication medium. The processing of the stream of symbol may include operations such as digital to analog conversion, lowpass filtering.

In some embodiments, the segmentation operation may comprise serial-to-parallel conversion of the information bits such that each segment has a size equal to the number of bits used to generate constellations of a downstream modulation scheme. For example, 3 bits per segment may be used for 8 QAM modulation.

In some embodiments, the number of bits per segment may be equal to the block size for the downstream forward error correction scheme used. For example, 40 or 80 bit segments may be used for FEC block. In general, FECs with different error protection may be used and thus each FEC block may have a same number of bit size on the output (so that the outputs of each FEC can be combined to form symbols) but may have a different number of input bits. For example, the bit-expansion due to a stronger FEC code may mean fewer input bits will produce the same number of output FEC bits. However, in some embodiments, some FEC modules may have same input and output bit sizes but may offer different degrees of error correction coding due to algorithmic differences in the error correction code used for implementing the FEC.

In some embodiments, the transmission signal generation operation 606 may include application of a symplectic transform such as the OTFS transform to the signal to transform a corresponding delay-Doppler domain signal to a signal that is used for transmission.

In another example aspect, a wireless communication method 700, implemented at a receiver-side is disclosed. The method 700 include performing channel equalization on the signal to generate a channel equalized signal (702), logically dividing the channel equalized signal into a first number of segments, wherein the number of segment is equal to a second number of segments used at a transmitter-side to generate the signal (704), demodulating and symbol de-mapping the channel equalization signal in successive steps such that each step operates to recover one or more bits of one of the number of the segments to generate a demodulated bitstream (706), processing the demodulated bitstream to generate information related to the bits from the signal (708), and providing a feedback signal to the channel equalization operation based on the processing of the demodulated bitstream (710). The order in which the successive steps are performed depends on a reliability of success of recovering the one bit in each of the successive steps.

For example, the processing 710 may include forward error correction decoding using a plurality of forward error correction codes, at least some of which have different block sizes. In some embodiments, the feedback provided in step 710 may be based on performing symbol mapping and orthogonal time frequency space transformation to generate a feedback signal. In some embodiments, the processing operation 710 may include deinterleaving each segment of the first number of segments, and forward error correction decoding using a plurality of forward error correction codes, at least some of which have different block sizes, outputs of the deinterleaving of the first number of segments.

Figure 8:
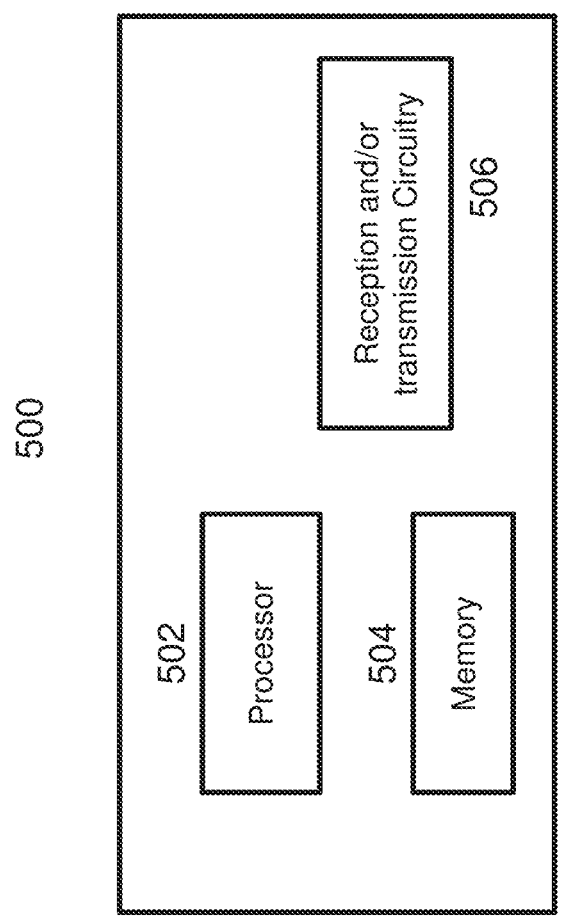
FIG. 8 shows an example of a wireless transceiver apparatus.

FIG. 8 shows an example of a wireless transceiver apparatus 500. The apparatus 500 may be used to implement method 600 or 700. The apparatus 500 includes a processor 502, a memory 504 that stores processor-executable instructions and data during computations performed by the processor. The apparatus 500 includes reception and/or transmission circuitry 506, e.g., including radio frequency operations for receiving or transmitting signals.

Figure 9:
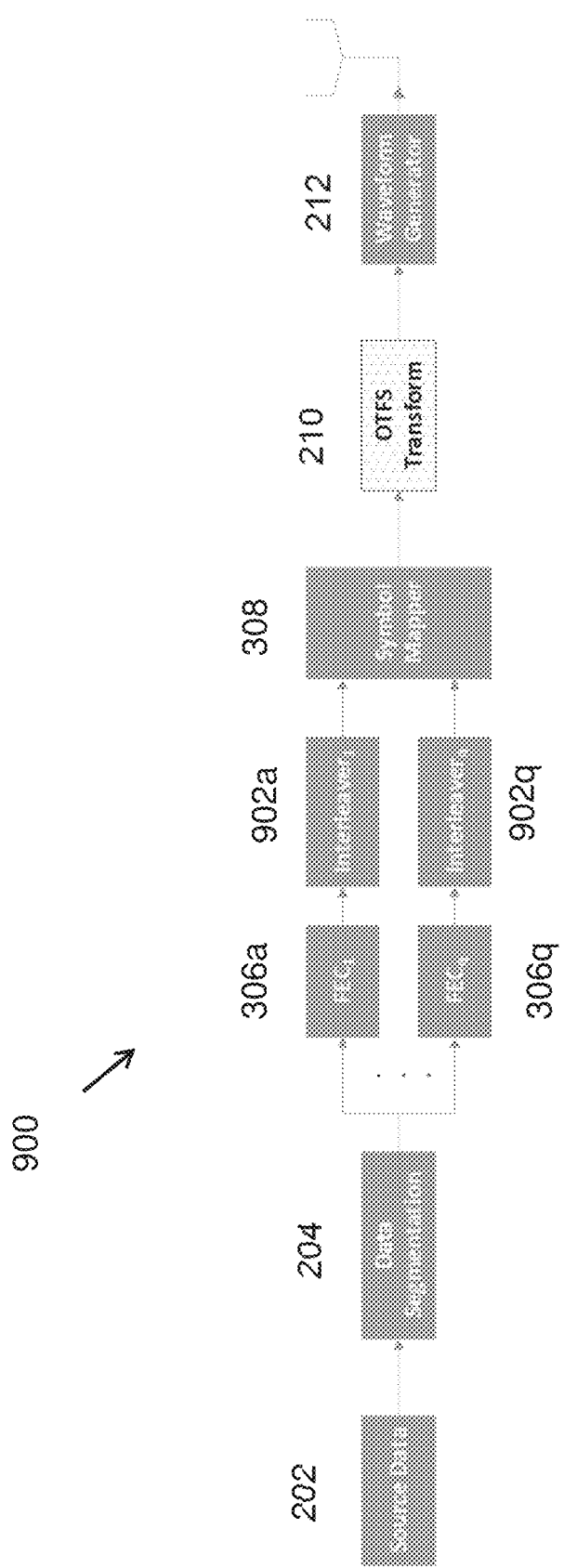
FIG. 9 is a block diagram showing an example of a multi-level transmission system that includes an interleaving function.

FIG. 9 depicts another example transmit chain 900 that uses multi-level data segmentation and encoding. Compared to the transmit chain 300, in the transmit chain 900, after data segmentation, each data segment may be encoded by its own FEC code ($FEC_1$ to $FEC_q$) and the corresponding interleaver functions 902a to 902q. The resulting outputs of the interleaver may then be combined prior to the symbol mapping 308. For example, data segments may represent bits with different importance or significance (e.g., least significant bit position, most significant bit position etc.). The corresponding FEC code may have a block size to provide an error protection that is proportional to the importance of that bit in the message being transmitted.

Figure 10:
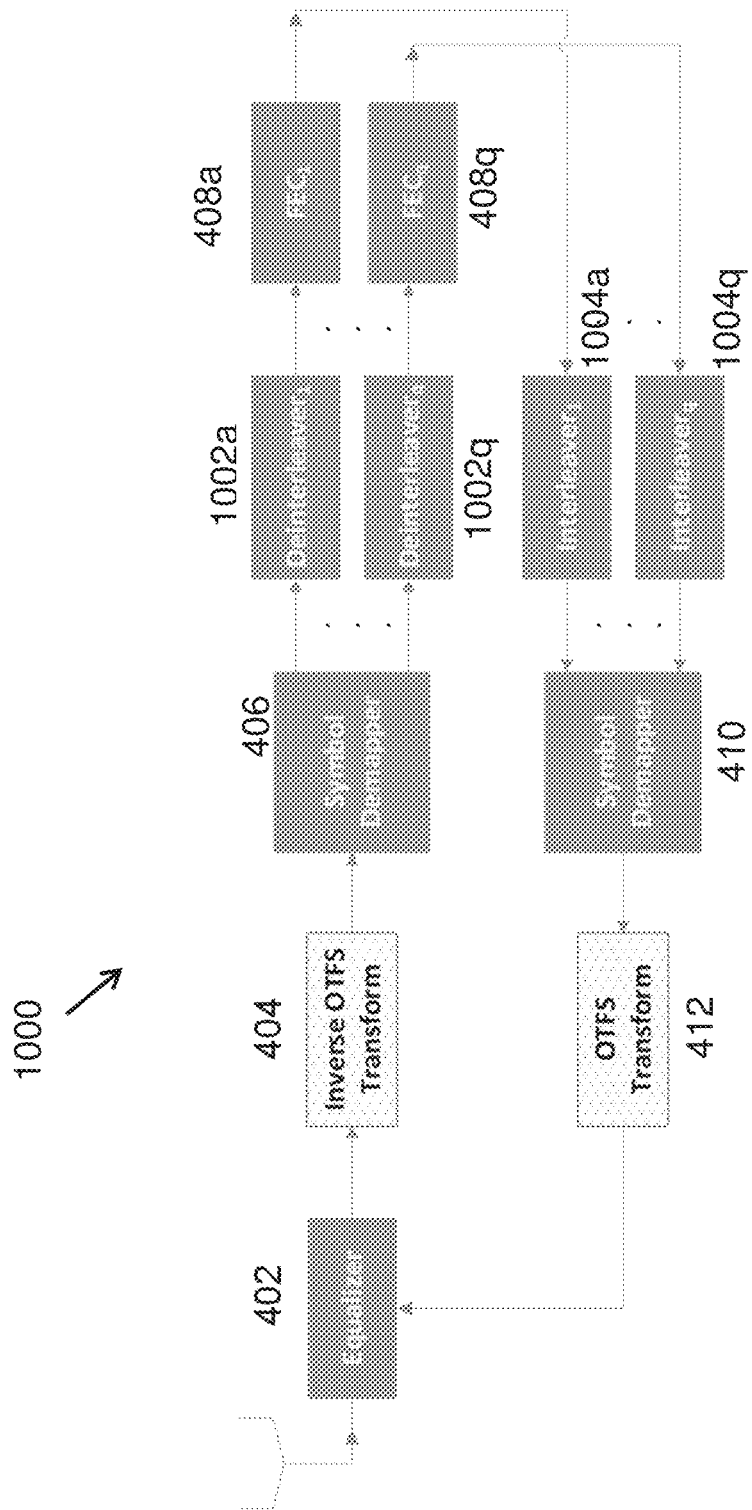
FIG. 10 is a block diagram showing of an example of an iterative receiver apparatus that includes a de-interleaving function.

FIG. 10 depicts another example OTFS receiver 1000 in which, compared to the receiver 400, a deinterleaving function is used for each level. In the forward path of the receive chain, deinterleavers 1002a to 1002q are used, respectively, to deinterleave segments generated from the symbol demapper. The deinterleaved output of each deinterleaver is then fed into the corresponding FEC block. In the feedback path, the output of each FEC block is fed into the corresponding interleaver function 1004a to 1004q and the outputs of the interleaving operations are used by the symbol demapper 410.

Examples of Multi-Level Coding and Decoding Schemes

In some multi-level-coding schemes where different code rates are assigned to different bits in the constellation label, along with methods for obtaining the optimal rates. Decoder embodiments may start from the least reliable bits, decode them, remove them from the received signal and decode the next reliable bit up to the most reliable bit.

It will be appreciated that the disclosed techniques can be used to improve transmission/reception performance of wireless apparatus.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A wireless communication method for transmitting orthogonal time frequency space (OTFS) modulated wireless signals from a transmitter, comprising:
   receiving information bits for transmission;
   segmenting the information bits into a stream of segments;
   applying a corresponding forward error correction (FEC) code to each of the stream of segments and combining outputs of the FEC codes to generate a first stream of symbols;
   transforming, using an OTFS transformation comprising a symplectic transform, the first stream of symbols into a second stream of symbols;
   processing the second stream of symbols to generate a waveform; and
   transmitting the waveform over a communication medium.

2. The method of claim 1, wherein each segment in the stream of segments has an equal bit length.

3. The method of claim 1, wherein at least some of the FEC codes have different block sizes from each other.

4. The method of claim 1, wherein each segment in the stream of segments is applied to one or more constellation symbol labels.

5. The method of claim 1, wherein the combining the outputs of the FEC codes includes:
   performing, on an output of each FEC, a corresponding interleaving operation; and
   combining outputs of the interleaving operations to generate the first stream of symbols.

6. The method of claim 1, wherein different FEC codes are used for header and payload portions of the information bits.

7. A wireless communication method, implemented at a receiver-side, for receiving a signal comprising multiple symbols; comprising:
   performing channel equalization on the signal to generate a first channel equalized signal;
   transforming, using an inverse orthogonal time frequency space (OTFS) transformation comprising an inverse symplectic transform, the first channel equalized signal into a second channel equalized signal;
   logically dividing second the channel equalized signal into a first number of segments;
   demodulating and symbol de-mapping the channel equalization signal in successive steps such that each step operates to recover one or more bits of one of the first number of segments to generate a demodulated bitstream, wherein an order in which the successive steps are performed depends on a reliability of success of recovering the one or more bits in each of the successive steps;
   processing the demodulated bitstream to generate information related to the bits from the signal; and
   providing a feedback signal to the channel equalization operation based on the processing of the demodulated bitstream.

8. The method of claim 7, wherein the processing the demodulated bitstream comprises forward error correction decoding using a plurality of forward error correction codes, at least some of which have different block sizes.

9. The method of claim 7, wherein the providing the feedback signal comprises performing symbol mapping and an orthogonal time frequency space (OTFS) transformation to generate the feedback signal.

10. The method of claim 7, wherein the order of which the successive steps are performed is from the most reliable bit to the least reliable bit.

11. The method of claim 7, wherein the processing the demodulated bitstream comprises deinterleaving each segment of the first number of segments, and forward error correction decoding using a plurality of forward error correction codes, at least some of which have different block sizes, outputs of the deinterleaving of the first number of segments.

12. The method of claim 7, wherein the providing the feedback signal comprises interleaving, the recovered one or more bit-related information from each of the first number of segments using a corresponding interleaver depth.

13. A wireless communication device comprising a processor configured to implement a method for transmitting orthogonal time frequency space (OTFS) modulated wireless signals from a transmitter the method comprising:
   receiving information bits for transmission;
   segmenting the information bits into a stream of segments;

applying a corresponding forward error correction (FEC) code to each of the stream of segments and combining outputs of the FEC codes to generate a first stream of symbols;

transforming, using an orthogonal time frequency space (OTFS) transformation comprising a symplectic transform, the first stream of symbols into a second stream of symbols;

processing the second stream of symbols to generate a waveform; and transmitting the waveform over a communication medium.

14. A non-transitory computer-readable memory storing instructions comprising processor-implementable code, wherein the code include instructions which, when executed by the processor, cause the processor to implement method for transmitting orthogonal time frequency space (OTFS) modulated wireless signals from a transmitter, comprising:

instructions for receiving information bits for transmission;

instructions for segmenting the information bits into a stream of segments;

instructions for applying a corresponding forward error correction (FEC) code to each of the stream of segments and combining outputs of the FEC codes to generate a stream of symbols;

instructions for transforming, using an orthogonal time frequency space (OTFS) transformation comprising a symplectic transform, the first stream of symbols into a second stream of symbols;

instructions for processing the second stream of symbols to generate a waveform; and instructions for transmitting the waveform over a communication medium.

15. A wireless communication device comprising a processor configured to implement a method for receiving a signal comprising multiple symbols, the method comprising:

performing channel equalization on the signal to generate a first channel equalized signal;

transforming, using an inverse orthogonal time frequency space (OTFS) transformation comprising an inverse symplectic transform, the first channel equalized signal into a second channel equalized signal;

logically dividing the second channel equalized signal into a first number of segments;

demodulating and symbol de-mapping the channel equalization signal in successive steps such that each step operates to recover one or more bits of one of the first number of segments to generate a demodulated bitstream, wherein an order in which the successive steps are performed depends on a reliability of success of recovering the one or more bits in each of the successive steps;

processing the demodulated bitstream to generate information related to the bits from the signal; and providing a feedback signal to the channel equalization operation based on the processing of the demodulated bitstream.

16. The wireless communication device of claim 15, wherein the processing the demodulated bitstream comprises forward error correction decoding using a plurality of forward error correction codes, at least some of which have different block sizes.

17. A non-transitory computer-readable memory storing instructions comprising processor-implementable code, wherein the code includes instructions which, when executed by the processor, causes the processor to implement method for receiving a signal comprising multiple symbols, comprising:

instructions for performing channel equalization on the signal to generate a first channel equalized signal;

instructions for transforming, using an inverse orthogonal time frequency space (OTFS) transformation comprising an inverse symplectic transform, the first channel equalized signal into a second channel equalized signal;

instructions for logically dividing the second channel equalized signal into a first number of segments;

instructions for demodulating and symbol de-mapping the channel equalization signal in successive steps such that each step operates to recover one or more bits of one of the first number of segments to generate a demodulated bitstream, wherein an order in which the successive steps are performed depends on a reliability of success of recovering the one or more bits in each of the successive steps;

instructions for processing the demodulated bitstream to generate information related to the bits from the signal; and instructions for providing a feedback signal to the channel equalization operation based on the processing of the demodulated bitstream.

18. The non-transitory computer-readable memory of claim 17, wherein the processing the demodulated bitstream comprises forward error correction decoding using a plurality of forward error correction codes, at least some of which have different block sizes.

* * * * *